Patented Apr. 15, 1952

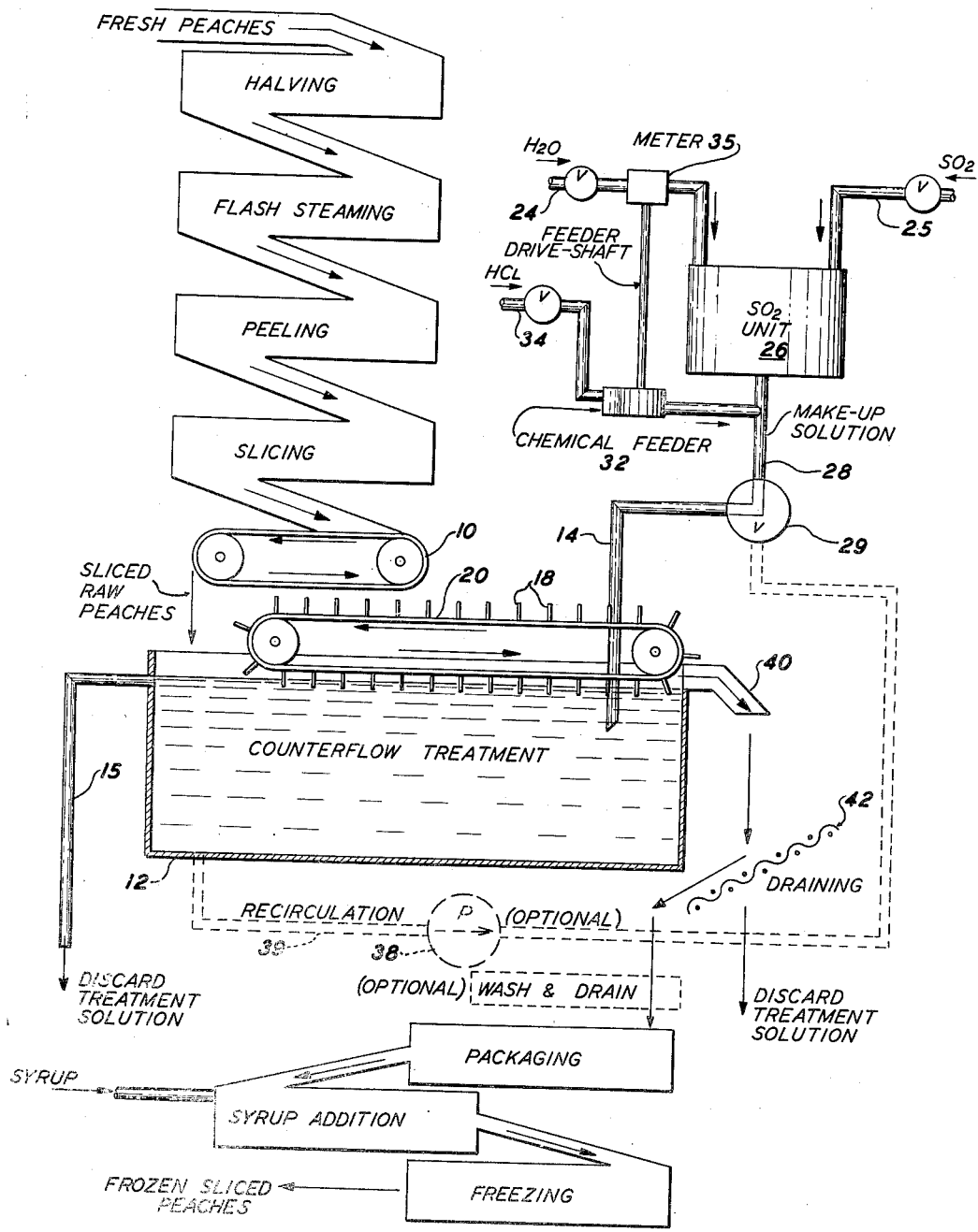

2,592,563

UNITED STATES PATENT OFFICE 2,592,563

STABILIZATION OF COLOR IN FRUIT

James E. Hall, Mount Vernon, and Edward A. Heiss, Bothell, Wash., assignors to Wallace & Tiernan Products, Inc., Belleville, N. J., a corporation of New Jersey Application May 29, 1948, Serial No. 30,144

9 Claims. (Cl. 99—193)

This invention relates to the freezing of fruits and particularly to the prevention of discoloration in frozen fresh fruits.

One of the problems encountered in the frozen fruit industry is the discoloration, known in the industry as "browning," of certain fruits while in the frozen state or after thawing. Browning may be enzymatic but possibly results from a non-enzymatic reaction between the amino acids and sugars in the fruit. The reaction apparently proceeds even at the low temperatures of the frozen product, accounting for the progressive discoloration occurring between the time the fruit is frozen and the time it is ultimately consumed.

The tendency of certain fruits to discolor after freezing seems to increase as the season progresses. This can be explained on the basis that the sugar content of the fruit increases throughout the season and the progressively increasing sugar content increases the probability of reaction thereof with the amino acids.

Numerous methods have been proposed for inhibiting the above reaction. One such method involves the addition of ascorbic acid or a mixture of ascorbic and citric acids to the fruit prior to freezing. Treatment with ascorbic acid has been found to only partially inhibit the discoloration and is particularly ineffective on fruit which is not completely immersed in syrup when frozen. The cost of using this method is high. Treatment with mixed ascorbic and citric acids results in an undesirable change in the natural color of the fruit.

Another proposal involves incorporation of approximately 3,000 parts per million of sulfur dioxide in the wash water. This treatment inhibits the discoloration of the frozen product but bleaches the product and further offers the disadvantage of imparting an objectionable taste thereto.

The process of the present invention offers advantages over the above mentioned processes in that it results in a color-stable frozen product. The original color and taste of the fruit remains natural and unchanged.

A typical procedure followed in freezing fruit, as for example peaches, involves the sequential steps of halving the fruit, peeling, slicing, packaging, adding syrup, and finally freezing. In accordance with our invention we modify the above process by interjecting a treating step prior to the addition of syrup and preferably after the fruit has been sliced. Freezing of other fruits more or less follows the above pattern, varying therefrom only in requiring additional or fewer steps dependent upon the character of the fruit. For example a process of freezing berries will not include a peeling step and a process of freezing apples must include a coring step. In any event the treating process of the invention is employed prior to packaging and preferably after the fruit has been cut to size.

As a basis for the process of our invention, we have found that if the raw peeled fruit, say peaches, is treated in a sulfur dioxide-water solution having a pH between about 1.0 and about 2.5 and a sulfur dioxide content of less than about 600 parts per million, discoloration of the fruit is inhibited without destroying the natural color. As a possible explanation for the effectiveness of this comparatively mild sulfur dioxide treatment, the sulfur dioxide may react with increased efficiency in the pH range indicated to form addition products with the fruit sugars and amino acids. In this manner the sugars and acids are bound up so as to inhibit color-producing interaction.

The accompanying flow diagram of the process will serve to present a clear understanding of the invention. It is understood that the invention is not limited to peaches inasmuch as other fruits such as apricots, red berries, etc., may also be treated in substantially the same manner, to inhibit post freezing discoloration.

As indicated in the drawing, the fresh peaches are first halved. The halves then pass along a continuous conveyer with the skin sides up and are subjected to a flash steam treatment at about 180° F. for approximately 60 seconds. The steam serves to loosen the skins from the fruit, facilitating the peeling step which follows. The peeled fruit is then sliced and deposited on a conveyer 10 from whence it is discharged into a treating tank 12.

In the treating tank the sliced peaches are immersed in treating solution, introduced into the tank through pipe 14 and discharged therefrom through pipe 15. The peach slices are carried through the tank counter-currently to the liquid flow by rakes 18 which dip into the solution and travel therein on a continuous belt 20 to which they are attached.

In one application of the invention, we use a solution of sulfur dioxide in water containing from about 100 to 500 parts per million of sulfur dioxide and a sufficient amount of mineral acid to establish the pH of the solution between about 1.0 and 2.0.

An important factor in the successful application of the process of the invention is the composition of the treating solution. Obviously any localized over-concentration of $SO_2$ will tend to produce the undesirable effects associated with heavy $SO_2$ treatment. Conversely periodic under-concentration is to be avoided in order to insure uniformity in the treated product. Similarly, uniformity within the pH range indicated is important.

Substantially the same considerations are of importance in the conventional chlorination processes for sterilizing water, etc. Accurate and dependable equipment has been developed for measuring and applying chlorine. We have found that equipment of this type is admirably suited to the incorporation of accurately measured and uniform quantities of $SO_2$ in the present treating solution. Such a unit, including acid metering means, is illustrated diagrammatically as a part of the process flow sheet shown in the drawing.

In the apparatus, water and $SO_2$ are introduced through lines 24, 25 respectively, into an $SO_2$ proportioning unit 26. As above indicated, the unit 26 may be a conventional chlorinator adapted to meter $SO_2$. The $SO_2$ solution is discharged from the unit through makeup line 28, valve 29 and inlet line 14 into the treating tank 12. Any acid required to adjust the pH of the treating solution is metered directly into the makeup line 28 by a chemical feeder 32. Acid is fed into the chemical feeder through line 34 and is proportioned in response to a meter 35 in the water inlet line 24.

The use of the apparatus above described for preparing the treating solution does not constitute a limitation of the invention. Substantially any method of producing the solution may be employed, but from the standpoint of reliability and uniformity of the solution and, correlatively, consistency of the treated fruit, some means of accurate control is preferred. In general the conventional method of continuously bubbling $SO_2$ directly into the treating bath is to be avoided because of objectionable fumes and localized over-concentration of sulfur dioxide.

In employing the preferred solution, sulfur dioxide and mineral acid, such as hydrochloric acid, are combined as described above and fed into the treating tank. The flow of solution through the treating tank is from right to left, as viewed in the drawing, and the flow of sliced peaches is from left to right. A pump 38 and a re-circulation line 39 are shown as an optional embodiment by means of which the solution may be re-circulated from the discharge end of the treating tank to the inlet end.

Another important factor in the successful application of the process is the contact time of the peaches with the treating solution. For best results we have found that the residence time of the peaches in the treating tank should be approximately 105 seconds although variations one way or the other therefrom do not materially alter the character of the product. Similarly we have found that best results are obtained if the treating solution is maintained at a temperature of approximately 65° F. or below. In many cases therefore, ambient temperature will be satisfactory, thereby eliminating the necessity of heating or cooling a large volume of liquid. Low temperature treatment as in the range of 35° to 45° F. appears to lower the $SO_2$ requirements.

In the practice of the invention, it is not essential that the $SO_2$ be introduced as such into the treating solution. It is equally feasible to generate the desired $SO_2$ concentration by employing a soluble sulfite or bisulfite, such as those of sodium, and adding acid in sufficient concentration to bring about the generation of the requisite $SO_2$ and at the same time to attain suitable hydrogen ion concentration. In this method it is equally important to insure uniformity of $SO_2$ concentration in the treating solution. This can be accomplished by adequate mixing of the solution before contact with the fruit.

Although, we have shown a counter-current treating step, it is equally within the contemplation of the invention to employ concurrent treatment or even a batch process. In any of these alternative means of treatment, the solution composition should be about the same as above described and the contact time of the fruit in the solution should be from about 80 seconds to about 140 seconds and preferably about 105 seconds.

Referring again to the flow sheet, the peaches arriving at the right hand end of the counter-current treating tank are discharged over a weir 40. Any solution carried over the weir with the fruit is drained therefrom by discharging the fruit onto a screen 42. The fruit may then be packed directly or alternatively may be washed as an optional step prior to packaging.

In packaging the normal procedure is to fill cellophane bags or other containers with a predetermined amount of fruit. Syrup is then added to the fruit in the individual containers and the syrup and fruit are frozen together. The syrup may be a simple sugar syrup containing from about 30% to about 65% by weight of sugar.

Treatment of other fruits such as apricots and red berries follows substantially the procedure set forth above.

For best results the conditions of operation in the treating process are varied slightly as the season for the fruit being treated advances. As indicated above, the sugar content of substantially any fruit increases during the season and it is advisable to likewise increase the sulfur dioxide content of the treating solution to keep step with the increased sugar content.

Thus at the first of the season, we may use only about 100 to 300 p. p. m. of sulfur dioxide and sufficient acid to bring the pH of the solution in the range of 1 to 2. As the season advances we may progressively increase the amount of sulfur dioxide to a maximum of about 500 to 600 p. p. m., adjusting the acid content correspondingly to establish the correct pH.

In a preferred form of the invention, the solution comprises sulfur dioxide, mineral acid and water. The low pH established by use of mineral or other acids appears to increase the efficiency of the inhibiting action of the sulfur dioxide. Substantially any mineral acid including hydrochloric acid, phosphoric acid, sulfuric acid and the like, is satisfactory for this purpose, best results being obtained with hydrochloric acid. Organic acids such as acetic, benzene sulfonic, malonic, oxalic, salicyclic and the like, or mixtures of organic and mineral acids may be employed for this purpose.

In general any acid which will not oxidize or otherwise interact to destroy the $SO_2$ and which has a sufficiently high ionization constant to establish the solution pH within the desired range, is satisfactory. Examples of both mineral and organic acids which meet these qualifications are given above.

To accomplish the increased activity of the sulfur dioxide it is necessary for the solution to have a pH of between 1.0 and 2.5. The amount of acid required to produce a pH in this range will depend upon the concentration of sulfur dioxide, as well as upon the original pH of the water. Thus at the lower range of sulfur dioxide concentration, say approximately 100 to 150 p. p. m., a greater amount of acid will have to be added to produce a pH of less than 2.5 than at the upper range of sulfur dioxide concentration of from about 500 to 600 p. p. m. Similarly the amount of acid required will depend upon ionization constant of the acid employed.

It will be noted that the upper pH limit has been referred to generally as about 2.5. Although this pH is entirely satisfactory it is desirable to maintain the pH below about 2.0 when lower concentrations of $SO_2$ are employed. Apparently there is an inverse relationship between the $SO_2$ concentration and the maximum pH at which best results are obtained.

We are enabled, by proper control of the pH of the $SO_2$ wash solution to materially reduce the $SO_2$ content thereof necessary to effectively inhibit discoloration of the fruit. At the same time the reduction in the $SO_2$ requirements eliminates objectionable taste and bleaching normally associated with the more conventional heavy $SO_2$ treatments (say 1500 p. p. m. or more). The chemistry involved is not thoroughly understood but is thought that at a pH of less than 2.5 and preferably less than 2.0 the reaction between the $SO_2$ and the fruit sugars or amino acids is favored so as to render more effective a relatively smaller concentration of $SO_2$ in the treating solution.

It also appears that the presence of a mineral or organic acid may have some beneficial results apart from the effect thereof on the solution pH. For this reason one aspect of the invention contemplates treatment of fruit prior to freezing with an $SO_2$-water solution containing at least about 100 parts of $SO_2$ per million parts of water but an insufficient amount of $SO_2$ to establish the pH of the solution below about 2.5, and sufficient acid, either mineral or organic, to bring the pH of the solution below about 2.5 and preferably below about 2.0.

We claim:

1. The process of treating fruit prior to freezing to stabilize the color thereof which comprises contacting the fruit with a water solution comprising from about 100 to about 500 parts of sulfur dioxide per million parts of water and sufficient acid to maintain the solution at a pH of from about 1.0 to about 2.5 and thereafter freezing the fruit without exposing untreated surfaces.

2. The process of treating fruit prior to freezing to stabilize the color thereof which comprises contacting the fruit with a water solution containing from 100 to 500 parts of sulfur dioxide per million parts of water and hydrochloric acid in such proportion that the solution will have a pH of from about 1.0 to about 2.0 and thereafter freezing the fruit without exposing untreated surfaces.

3. The process of treating fruit prior to freezing to stabilize the color thereof which comprises counter-currently contacting the fruit for a period of about 80 to about 140 seconds with a water solution comprising from 100 to 500 parts of sulfur dioxide per million parts of water and sufficient acid to maintain the solution at a pH of from about 1.0 to about 2.0 and thereafter freezing the fruit without exposing untreated surfaces.

4. The process of treating fruit prior to freezing which comprises contacting the fruit with an $SO_2$-water solution containing at least 100 parts of $SO_2$ per million parts of water but insufficient $SO_2$ to bring the pH of the solution below about 2.5, and sufficient acid to bring the pH of the solution below 2.5 and thereafter freezing the fruit without exposing untreated surfaces.

5. The process of treating fruit prior to freezing which comprises contacting the fruit with an $SO_2$-water solution containing at least 100 parts of $SO_2$ per million parts of water but insufficient $SO_2$ to bring the pH of the solution below about 2.5, and sufficient mineral acid to bring the pH of the solution below 2.5 and thereafter freezing the fruit without exposing untreated surfaces.

6. The process of treating fruit prior to freezing which comprises contacting the fruit with an $SO_2$-water solution containing at least 100 parts of $SO_2$ per million parts of water but insufficient $SO_2$ to bring the pH of the solution below about 2.5, and sufficient organic acid to bring the pH of the solution below 2.5 and thereafter freezing the fruit without exposing untreated surfaces.

7. In a process for freezing fruit including the steps of cutting the fruit into pieces, adding syrup to the cut fruit and thereafter freezing it, the improvement which comprises treating the fruit prior to the syrup addition in an $SO_2$ water solution having an $SO_2$ content between about 100 and 500 parts per million of water, and sufficient acid to maintain the pH of the solution between 1.0 and 2.0 and thereafter freezing the treated pieces.

8. In a process for freezing fruit including the steps of preparing the fruit, packaging the fruit, adding syrup to the packaged fruit and freezing the fruit, the improvement which comprises washing the fruit prior to the packaging step in an $SO_2$-water solution having an $SO_2$ content between about 100 and 500 parts per million parts of water, and sufficient mineral acid to maintain the pH of the solution between 1.0 and 2.0 and thereafter freezing the fruit without exposing untreated surfaces.

9. The process of treating fruit prior to freezing which comprises contacting the fruit with a solution of sulfur dioxide in water having an $SO_2$ content not in excess of about 600 parts per million of water, maintaining the pH of the solution between about 1.0 and 2.5 during the treatment, and thereafter freezing the fruit without exposing untreated surfaces.

JAMES E. HALL.
EDWARD T. HEISS.

REFERENCES CITED

The following references are of record in the file of this patent:

UNITED STATES PATENTS

| Number | Name | Date |
| --- | --- | --- |
| 2,298,933 | Elion | Oct. 13, 1942 |
| 2,420,322 | Matarazzo | May 13, 1947 |
| 2,475,838 | Johnson | July 12, 1949 |

OTHER REFERENCES

Weil et al., "Literature Search on the Preservation of Foods by Freezing," June 1946, Geo. Sch. of Tech., Atlanta, Georgia, paragraph bridging pages 140–141.